No. 882,376. PATENTED MAR. 17, 1908.
J. C. EICHELBERGER.
COMB REEL FOR HEADERS.
APPLICATION FILED MAY 14, 1907.
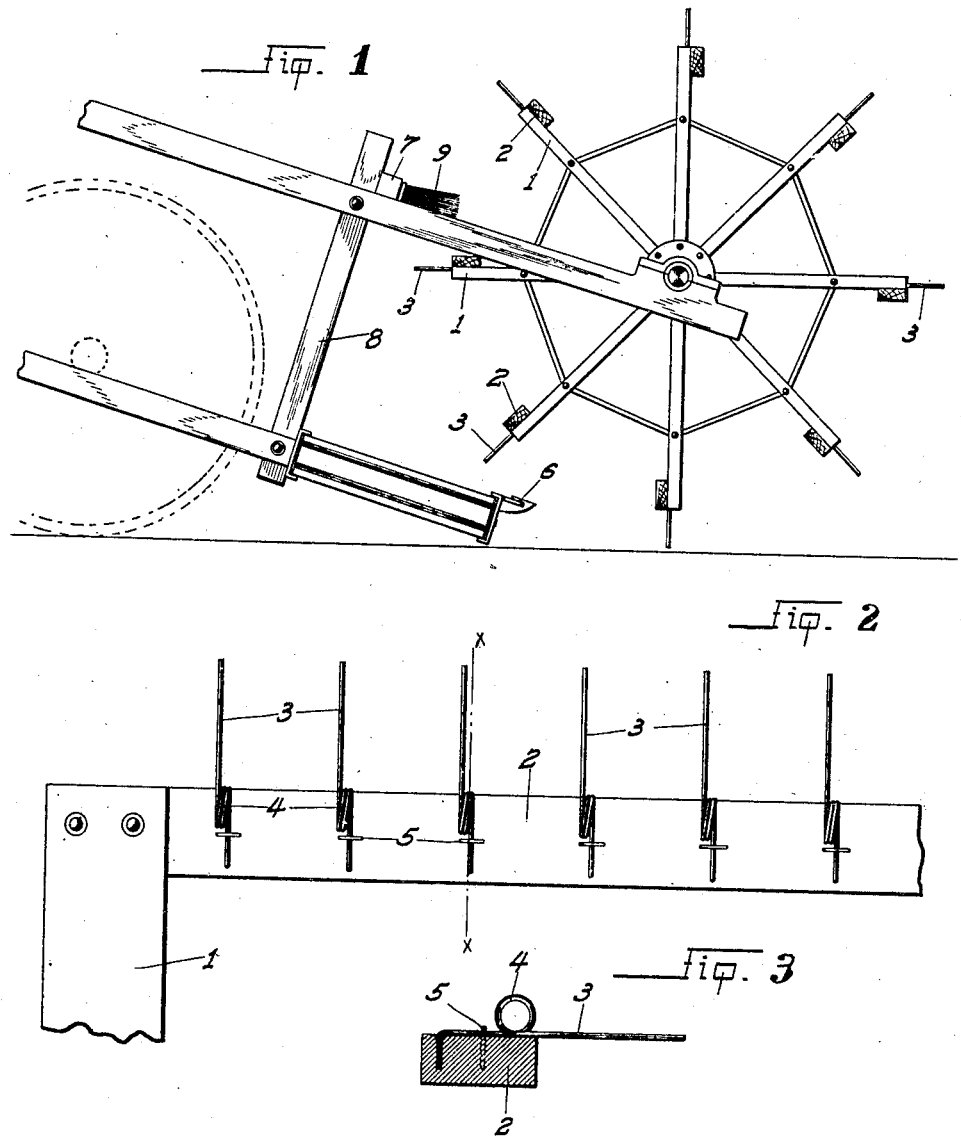

UNITED STATES PATENT OFFICE.

JOHN C. EICHELBERGER, OF STOCKTON, CALIFORNIA.

COMB-REEL FOR HEADERS.

No. 882,376.   Specification of Letters Patent.   Patented March 17, 1908.

Application filed May 14, 1907. Serial No. 373,695.

*To all whom it may concern:*

Be it known that I, JOHN C. EICHELBERGER, a citizen of the United States, residing at Stockton, in the county of San Joaquin and State of California, have invented certain new and useful Improvements in Comb-Reels for Headers; and I do declare the following to be a full, clear, and exact description of the same, such as will enable others skilled in the art to which it appertains to make and use the same, reference being had to the accompanying drawings, and to the characters of reference marked thereon, which form a part of this specification.

This invention relates to improvements in headers and particularly to those used on combined harvesters and similar machines, my object being to place such an improvement on the reels of such headers as will pick up fallen and lodged grain, and lifting the same up onto the cutter bar where it can be properly cut. This object and minor ones I accomplish by means of a plurality of spring comb teeth secured to the slats of a reel, and a brush attachment for cleaning said teeth; also by such other and further construction as will appear by a perusal of the following specification and claims.

In the drawings similar characters of reference indicate corresponding parts in the several views.

Figure 1 is an end elevation of a header reel with my improved device installed thereon. Fig. 2 is a fragmentary view of a reel slat showing my improved comb teeth attached thereto. Fig. 3 is a sectional view taken on a line $x$ $x$ of Fig. 2.

Referring more particularly to the reference characters on the drawings 1 designates the reel of a header while 2 designates the cross slats thereon.

3 are comb teeth having spring coils 4 intermediate their front and rear ends, the rear ends of said teeth being embedded in the slats 2 and being held stationary therein by means of staples 5 disposed intermediate said rear ends and said spring coils 4. Said comb teeth 4 extend beyond the outer edges of the slats 2 and as the reel rotates they comb into the fallen and lodged grain and lift it up onto the cutter bar 6.

Secured to and extending the full length of the upper cross beam 7 of the screen 8 is a broom or brush 9 of sufficient length as to sweep the projecting teeth 3 as they pass upward with the rotation of the reel 1, thus clearing off any weeds or grain that might cling thereto.

The spring coils 4 give a spring to the teeth 3 thus preventing them from bending or breaking or loosening from the slats 2.

The advantage gained by the use of the teeth 3 instead of the plain slats 2 as now used is that the slats only tend to smash down and flatten the grain even more than it is, while the teeth comb into it and lift it up as described. Thus it will be seen that I have produced a reel comb for headers which substantially fulfils all the objects of the invention as set forth herein.

While this specification sets forth the present and preferred embodiment of my invention, still in practice many small deviations therefrom may be resorted to at will without departing from the spirit of my invention.

Having thus described my invention, what I claim as new and useful and desire to secure by Letters Patent is:—

1. In a device of the character described a header, a reel thereon, slats on said reel, a plurality of wire teeth secured to said slats, and means for brushing said teeth, as set forth.

2. In a device of the kind described a header, a reel thereon, slats on said reel, wire teeth secured to said slats, a cross beam disposed to the rear of said reel, and a broom secured to said beam and adapted to brush said wire teeth, as set forth.

3. The combination in a header of a reel, slats on said reel, wire teeth secured to said reel, said teeth having spring coils intermediate their ends, a cross beam disposed to the rear of said reel, and means on said beam for brushing said teeth, as described.

In testimony whereof I affix my signature in presence of two witnesses.

JOHN C. EICHELBERGER.

Witnesses:
PERCY S. WEBSTER,
FRANK H. CARTER.